(12) United States Patent
Kaneko et al.

(10) Patent No.: US 7,563,402 B2
(45) Date of Patent: Jul. 21, 2009

(54) APPARATUS FOR AND METHOD OF MANUFACTURING AN OPTICAL DISC

(75) Inventors: Yukio Kaneko, Tokyo (JP); Yoshimi Yodokawa, Tokyo (JP); Takeshi Umega, Tokyo (JP); Mamoru Usami, Tokyo (JP); Tsuyoshi Komaki, Tokyo (JP)

(73) Assignee: TDK Corporation, Tokyo (JP)

( * ) Notice: Subject to any disclaimer, the term of this patent is extended or adjusted under 35 U.S.C. 154(b) by 527 days.

(21) Appl. No.: 11/385,820

(22) Filed: Mar. 22, 2006

(65) Prior Publication Data

US 2006/0214318 A1 Sep. 28, 2006

(30) Foreign Application Priority Data

Mar. 25, 2005 (JP) ............... 2005-087813

(51) Int. Cl.
*B28B 7/10* (2006.01)
*B28B 13/06* (2006.01)
*B28B 7/06* (2006.01)

(52) U.S. Cl. ............... 264/334; 264/1.33; 264/107; 264/299; 425/436 R; 425/440; 425/441; 425/444; 425/810

(58) Field of Classification Search ............... 264/1.33, 264/107, 278, 39, 304, 334, 336, 299; 425/351, 425/436 R, 440, 441, 444, 556, 810, 457, 425/274

See application file for complete search history.

(56) References Cited

U.S. PATENT DOCUMENTS 4,995,799 A * 2/1991 Hayashi et al. ............ 425/111
2004/0109915 A1 * 6/2004 Murata et al. ............ 425/566
2004/0219326 A1 * 11/2004 Komaki et al. ........... 428/64.4
2005/0046058 A1 * 3/2005 Suwa et al. .............. 264/1.33
2005/0053728 A1 * 3/2005 Komaki .................. 427/553
2005/0084644 A1 * 4/2005 Komaki et al. ........... 428/64.4
2005/0095771 A1 * 5/2005 Komaki et al. ........... 438/202

FOREIGN PATENT DOCUMENTS

| EP | 1508898 A1 * | 2/2005 |
| JP | 2001-126322 | 5/2001 |
| JP | 2003-326535 | 11/2003 |

OTHER PUBLICATIONS

English abstract of JP 2001126322.*

* cited by examiner

*Primary Examiner*—Timothy Kennedy
(74) *Attorney, Agent, or Firm*—Oblon, Spivak, McClelland, Maier & Neustadt, P.C.

(57) ABSTRACT

The present invention makes it possible to strip off a stamper stuck on a resin layer for groove formation during the manufacture of an optical disc from the resin layer without imparting damage or the like to the stamper. The present invention achieves this object by having the steps of bringing about a state in which the stamper protrudes from a substrate by a predetermined width, rotating the substrate with the back surface of the disc-shaped substrate attracted and held, elevating rollers capable of rolling relative to a contacting surface contacting with the protruding portion simultaneously with the rotation, and continuously applying a force working in a direction to separate the protruding portion from the substrate in the circumferential direction of the stamper.

5 Claims, 6 Drawing Sheets

APPARATUS FOR AND METHOD OF MANUFACTURING AN OPTICAL DISC

This application claims priority from Japanese Patent Application No. 2005-087813 filed Mar. 25, 2005, which is herein incorporated by reference.

BACKGROUND OF THE INVENTION

1. Field of the Invention

This invention relates to an apparatus for and a method of manufacturing an optical disc typified by a so-called DVD disc or a blue-ray disc. More particularly, it relates to an apparatus for and a method of manufacturing an optical disc more suitable when manufacturing an optical disc of a type having two recording layers on one surface thereof.

2. Related Background Art

For example, a blue-ray disc which is an optical recording medium called an optical disc is comprised of a substrate comprising polycarbonate or the like having a groove and a pit formed on the surface thereof, a sputter layer comprising a reflecting layer, a recording layer, etc. for example, by a sputtering method formed on the upper surface of the groove or the like, a light transmitting layer covering the upper surface of the sputter layer, and a protective layer covering the surface of the substrate. Also, there has been proposed a disc having a plurality of recording layers in order to further heighten a recording capacity, and in this disc, a spacer layer is formed on the upper surface of a sputter layer, and a groove and a pit are formed on the upper surface of the spacer layer. The above-mentioned sputter layer, etc. are further successively formed on the upper surface of the groove, etc. to thereby obtain a plurality of recording layers, and a further increase in the recording capacity is contrived.

When the above-described blue-ray disc is to be manufactured, the light transmitting layer and the spacer layer are obtained by sticking a viscous sheet, or by hardening a layer of resin or the like formed by a spin coat method. Both of these two methods have various characteristics, but when cost and productivity are taken into consideration, the spin coat method is considered to be practically more suitable. In this case, the groove, etc. on the spacer layer are obtained by pressure-sticking a stamper formed with a negative pattern in advance on the surface of the resin layer keeping fluidity, transferring this pattern, and thereafter stripping off the stamper form the surface of the resin layer.

At the stamper stripping-off step, heretofore, the stamper has been held by a jig, and a force has simply been applied in a direction perpendicular to the extension surface of the spacer to thereby strip off the stamper from the surface of the spacer (see, for example, Japanese Patent Application Laid-Open No. 2001-126322 A). In this method, however, there is the possibility of damaging not only the stamper, but also the spacer layer or the substrate, and in case of stripping-off, the application of a very great force has been required. Therefore, from the viewpoint of reducing the force required for stripping-off and starting smooth stripping-off, there has been proposed, for example, a method of forcibly forming cut-in in an aperture at the center of the disc, and inserting compressed air through a gap formed by partial stripping-off to thereby effect stripping-off.

Also, the inventor has proposed, as a method of executing the stripping-off step more smoothly and easily, a method of making the stamper layer than the surface of the substrate, and executing the stripping-off step by the use of that portion of the stamper which protrudes from the upper surface of the substrate (see, for example, Japanese Patent Application Laid-open No. 2003-326535 A). In this method, in a state in which the substrate is fixed, the protruding portion is pressed in a direction away from the substrate by a plurality of pins, and when the pins press the substrate, the respective pins effect pressing along the outer periphery of the substrate with a time difference provided among them. By the addition of such a construction, the ease of stripping-off and a reduction in a load given to the stamper, etc. during the stripping-off are contrived.

The optical disc which is a recording medium, along with an improvement in recording density, is required to become narrow in the width of the groove transferred to the spacer layer, and reliably transfer the groove shape. Thus, the stamper used for the transferring of the groove has a groove pattern which is minute and high in accuracy of formation, and the cost required for the working of the stamper itself is rising. Also, an ultraviolet ray or the like is applied to the spacer layer through the stamper to thereby carry out the hardening of this layer and therefore, the stamper is required to have sufficient thinness to transmit the ultraviolet ray therethrough and not to attenuate the intensity of the ultraviolet ray.

However, when the stripping-off of the stamper is effected by pushing up the vicinity of the outer periphery of the stamper from the surface of the substrate by the pins, the concentration of a load occurs to the contact portion between the pins and the stamper. Also, the frictional force between the tip ends of the pins and the contact surface of the stamper occurring to the contact portion is great. Therefore, there remains the possibility of damaging the stamper. Thus, it is necessary to disuse the expensive stamper after a relatively small number of times of use, and use a new stamper. Also, when the stamper is made into a thin layer having a thickness of e.g. 0.6 mm, there is the undesirable possibility that such a construction cannot cope with the thin-layer stamper.

SUMMARY OF THE INVENTION

The present invention has been made in view of the above-described situation, and has as an object thereof to provide an apparatus for and a method of stripping off a stamper, i.e., an apparatus for and a method of manufacturing an optical disc, which, even when use is made of a tin stamper having a thickness of e.g. 0.6 mm, are free of or reduced in the possibility of damaging the stamper and a spacer layer.

In order to solve the above-noted problem, an apparatus for manufacturing an optical disc according to the present invention is an apparatus for manufacturing an optical disc by which a disc-shaped stamper stuck on the upper surface of a disc-shaped substrate with a resin layer interposed therebetween so as to be concentric with the disc-shaped substrate and having an outer diameter layer than the outer diameter of the disc-shaped substrate is stripped off from the disc-shaped substrate, characterized by a table contacting with the underside of the disc-shaped substrate to thereby attract and hold the substrate and having as the upper surface thereof a circular surface having an outer diameter equal to or smaller than that of the disc-shaped substrate, rollers disposed at locations equidistant from the center of the circular surface of the table and at regular intervals around the table, contacting with an area which is the surface of the stamper opposed to the disc-shaped substrate and protrudes from the area stuck on the disc-shaped substrate, and capable of rolling relative to the contacting surface of the stamper, a first driving device for rotating the table relative to the rollers with the center of the circular surface of the table as a rotation center, and a second driving device for elevating the rollers relative to the circular surface of the table in a direction perpendicular to the circular surface.

In the above-described apparatus, it is preferable that the table be connected to the first driving device at the underside thereof, and the first driving device rotate the table. Also, it is preferable that the rollers be connected to the second driving device through a roller supporting arm for supporting the rollers for rolling movement, and the second driving device elevate the rollers. Further, it is preferable that the apparatus have an attracting pad located above the table and at a predetermined distance from the circular surface for attracting and holding the stripped-off stamper.

Also, in order to solve the above-noted problem, a method of manufacturing an optical disc according to the present invention is a method of manufacturing an optical disc by which a disc-shaped stamper stuck on the upper surface of a disc-shaped substrate with a resin layer interposed therebetween so as to be concentric with the disc-shaped substrate and having an outer diameter larger than the outer diameter of the disc-shaped substrate is stripped off from the disc-shaped substrate, characterized in that the substrate on having the stamper stucked thereon is attracted to and held on the circular surface of a table contacting with the underside of the disc-shaped substrate to thereby attract and hold the substrate and having as the upper surface thereof a circular surface having an outer diameter equal to or smaller than that of the disc-shaped substrate, rollers disposed at locations equidistant from the center of the circular surface of the table and at regular intervals around the table, contacting with an area which is the surface of the stamper opposed to the disc-shaped substrate and protrudes from the area stuck on the disc-shaped substrate, and capable of rolling relative to the contacting surface of the stamper are brought into contact with the protruding area, the table is rotated relative to the rollers with the center of the circular surface of the table as a rotation center and at the same time, the rollers are elevated relative to the circular surface of the table in a direction perpendicular to the circular surface.

According to the present invention, it becomes possible to sequentially continuously shift a position at which a load is applied to the stamper during stripping-off to a position which can effectively act on the stripping-off with the progress of the stripping-off. Therefore, unlike a case where a pin or the like is used, it is eliminated for a load to concentrate on a localized portion of the stamper in a state in which the action on the stripping-off has been reduced (at a position whereat contribution to the actual stripping-off is low), and the excessive concentration of the load to the stamper is prevented. Therefore, it becomes possible to execute the stripping-off step without giving damage or the like even to a thinner stamper. Also, the contact point between the stamper and a stripping-off jig is obtained by a roller rolling along the surface of the stamper so that it may become possible to effect the movement of this contact point with low friction. Accordingly, as compared with the case where the pin or the like is used, it becomes possible to reduce a frictional force at the contact point, and it also becomes possible to reduce the stripping-off load due to this frictional force.

Also, according to the present invention, the operations is the apparatus which become necessary with the stripping-off operation are only the operation of rotating the rotary table, the operation of moving up and down the thrusting-up roller, and the operation of retracting the stripping-off arm, and as compared with the construction shown in Japanese Patent Application No. 2003-326535 A, it becomes possible to reduce the number of constituents. Also, many of the constituents are simple in operation itself, and it also becomes possible to constitute a driving system by a simple driving device. Accordingly, it becomes easy to stabilize the stripping-off operation, and it is also easy to downsize the apparatus itself. Also, it is possible to continuously move the above-mentioned contact point (thrust-up point) and therefore, even if the speed of the stripping-off operation is increased, it does not lead to a great increase in the load to the stamper, and there is also obtained the effect of shortening the working time.

The above and other objects, features and advantages of the invention will become more apparent from the following detailed description taken in conjunction with the accompanying drawings.

DESCRIPTION OF THE PREFERRED EMBODIMENTS

Figure 1:
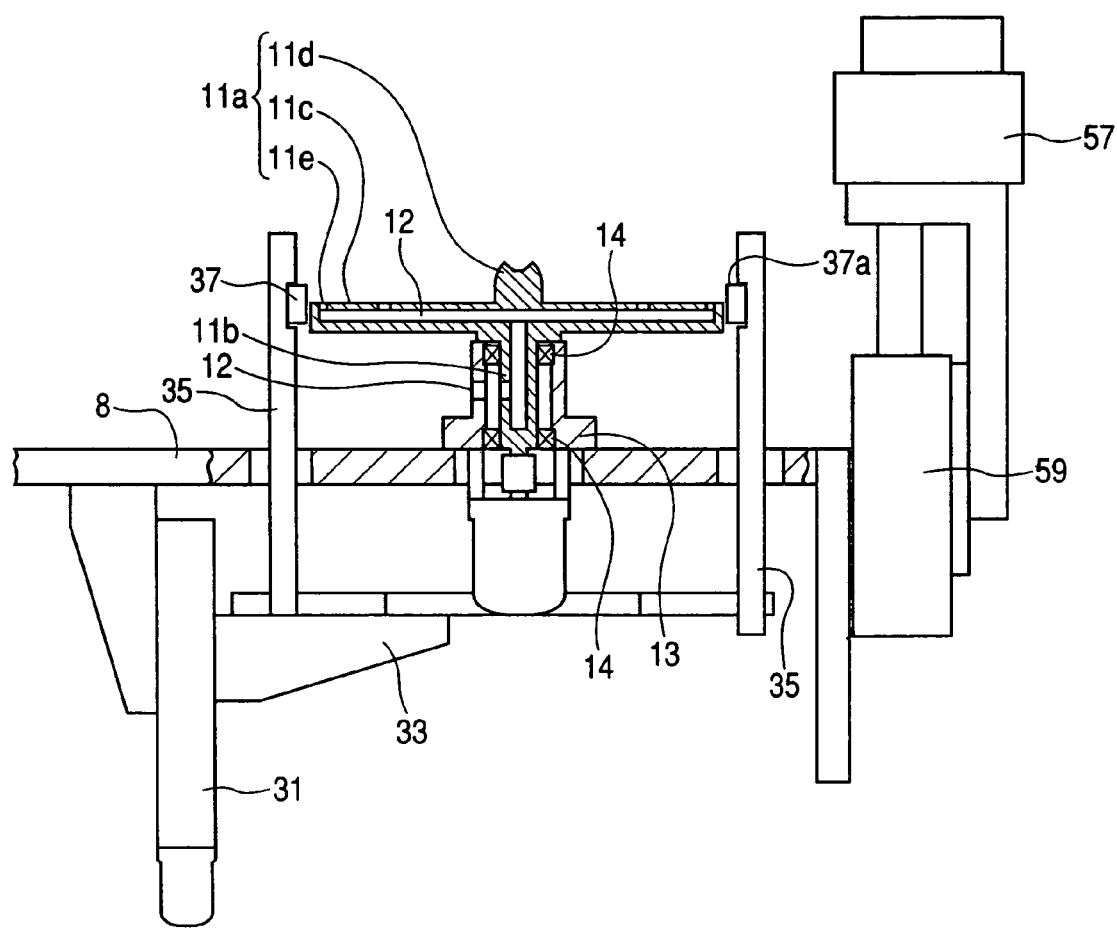
FIG. 1 is a side view of an apparatus for manufacturing an optical disc according to an embodiment of the present invention showing a state before a substrate with a stamper is mounted.
Figure 2:
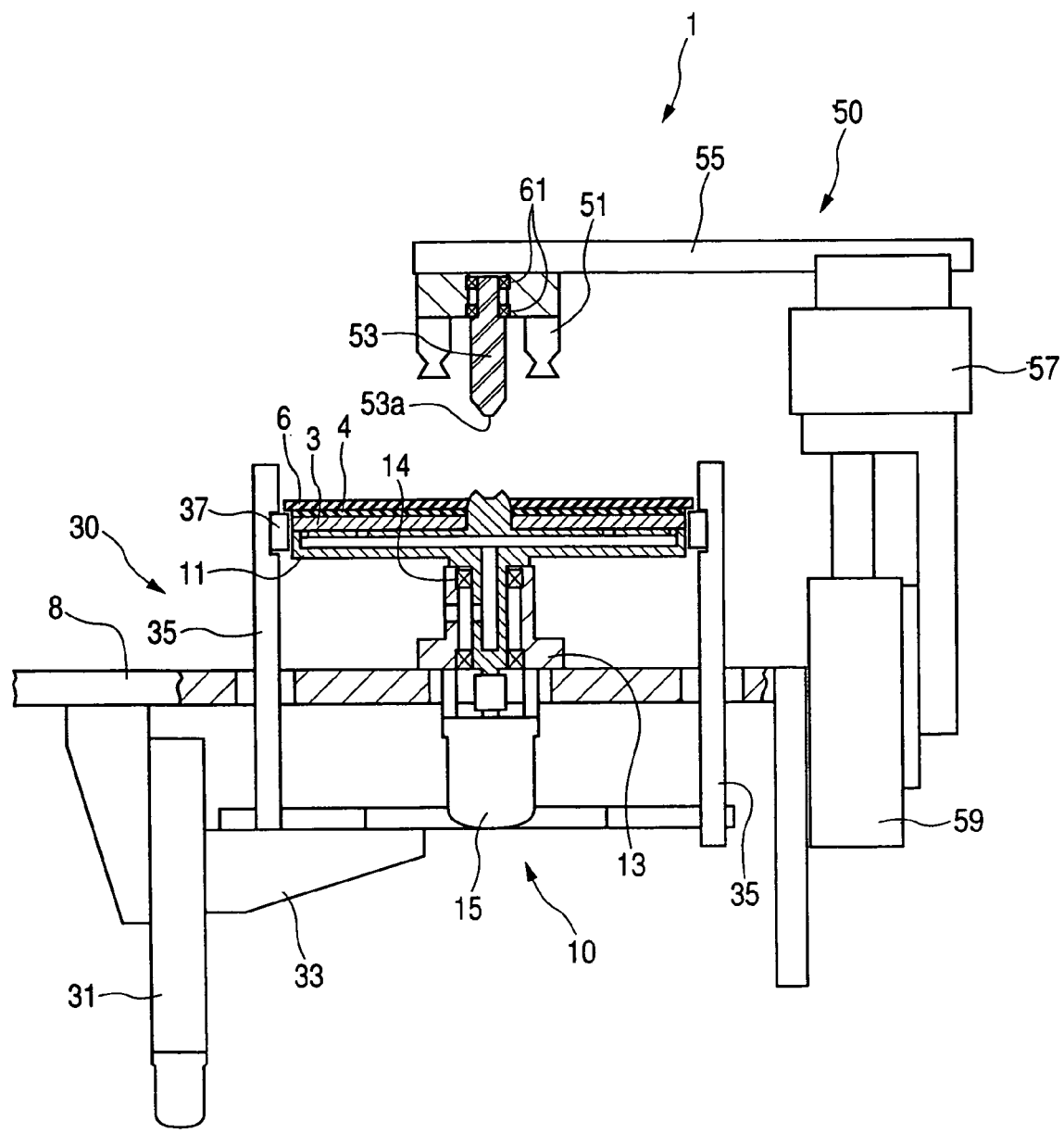
FIG. 2 shows a state after the substrate with the stamper has been mounted in the apparatus shown in FIG. 1.
Figure 3:
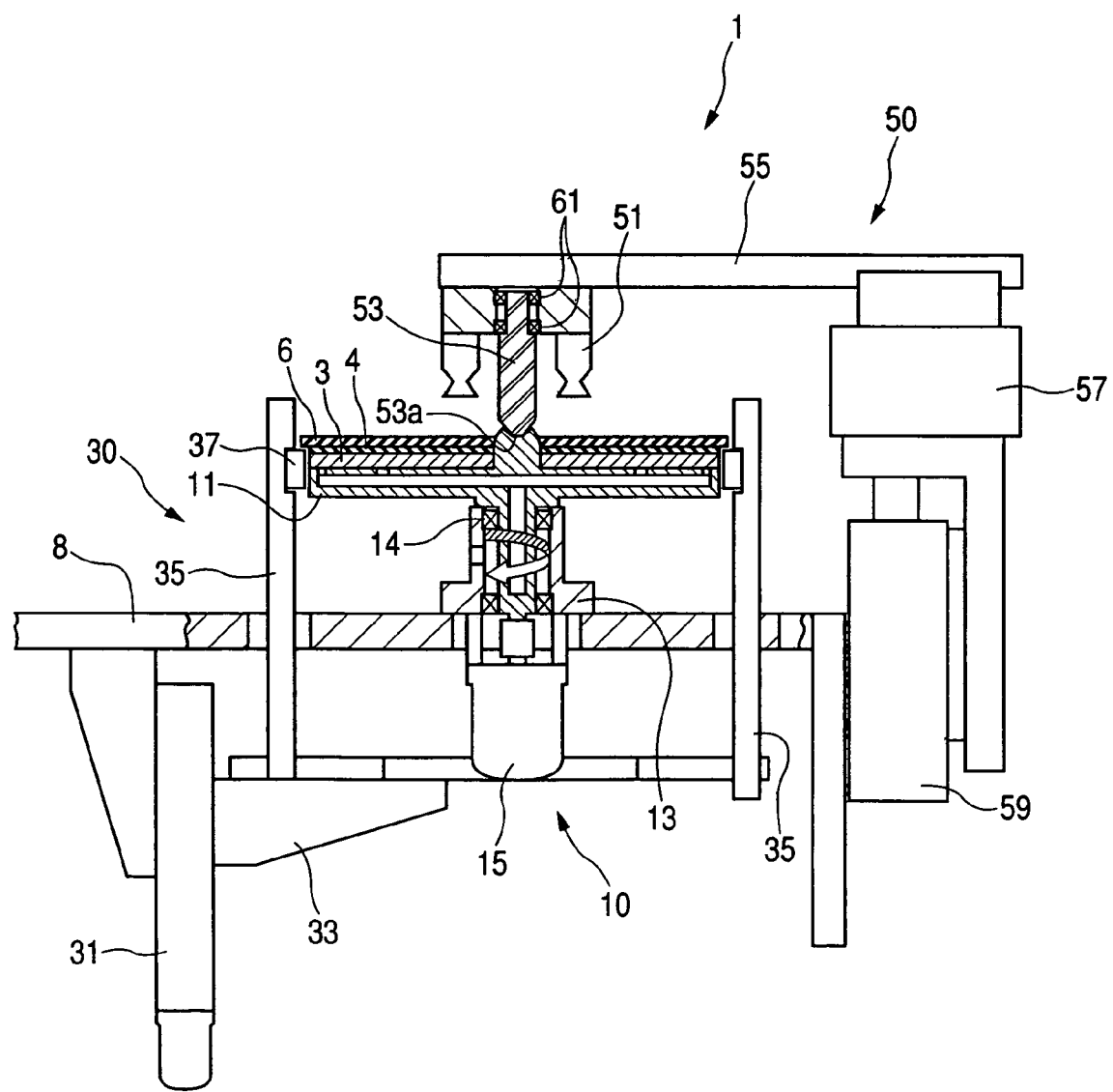
FIG. 3 shows a state in which the operation of stripping off the stamper has been started in the apparatus shown in FIG. 1.
Figure 4:
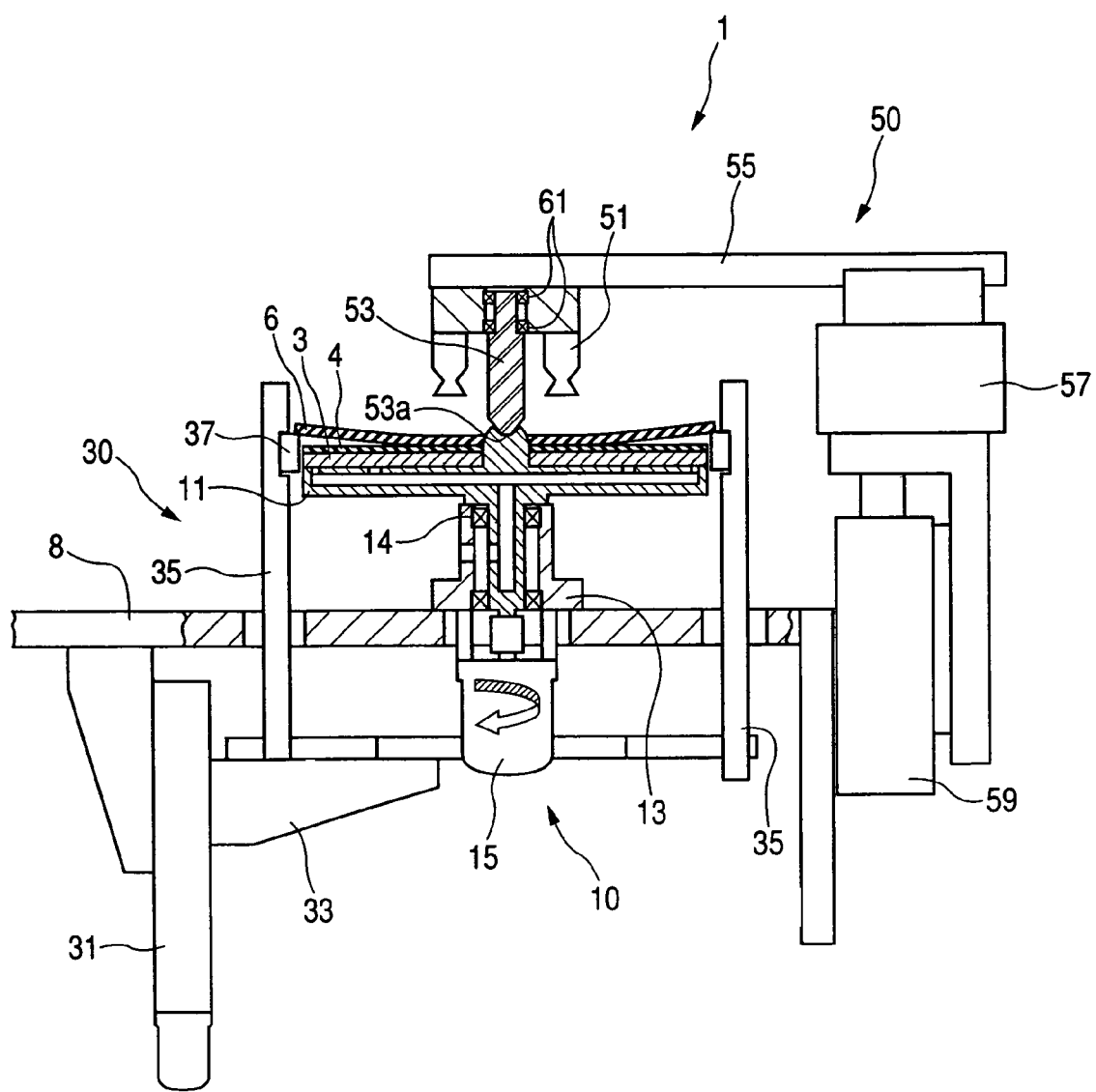
FIG. 4 shows a state in which the stamper is being stripped off in the apparatus shown in FIG. 1.

An embodiment of the present invention will hereinafter be described with reference to the drawings. FIGS. 1 to 6 schematically shows the main construction of an optical disc manufacturing apparatus, specifically a stamper stripping-off apparatus, according to the present invention, and are side views partly including a cross section along a plane perpendicular to the surface of a substrate when the substrate has been placed on the apparatus. FIG. 1 shows a state in which a substrate with a stamper is not mounted, FIG. 2 shows a state in which the substrate with the stamper has been mounted in the apparatus, and FIGS. 3 to 6 show a series of states of the apparatus in which the stamper is stripped off from the substrate.

The apparatus 1 has a substrate holding system 10, a stamper thrusting-up system 30 and a stamper holding system 50 as main constructions. In the present embodiment, a spacer layer 4 is formed on the entire upper surface of the substrate 3 mounted in the apparatus, and the stamper 6 is stuck on the upper surface of the spacer layer 4. The substrate 3 is of a disc shape having a through-aperture 3a in the central portion thereof, and the stamper 6 is of a disc shape having an outer diameter larger than that of the substrate 3. The stamper 6 also has a through-aperture 6a in the central portion thereof, and is stuck so that the center thereof may coincide with the center of the substrate 3. Thus, the stamper 6 protrudes outwardly of the substrate 3 over the entire periphery thereof. Also, in the present embodiment, the surface on which the substrate 3 extends is defined as a horizontal plane, that surface of the substrate 3 on which the spacer layer 4 is formed is defined as an upper surface, and a direction perpendicular to the horizontal plane is defined as an axial direction.

The substrate holding system 10 has a rotary table 11, a rotary shaft supporting portion 13 and a table rotating motor 15 as main constructions. The rotary table 11 has a substantially disc-shaped main body portion 11a extending in the horizontal plane, and a shaft portion 11b extending axially downwardly from the center of one substantially disc-shaped circular surface (back surface) The upper surface of the main body portion 11a acts as a substrate receiving surface 11c comprising a circular substantially flat surface having substantially the same size as the substrate 3, and a projected portion 11d inserted into the through-aperture 3a of the substrate 3 is disposed on the central portion of the substrate receiving surface 11c. Also, a plurality of attracting openings 11e are formed in the substrate receiving surface 11c, and the attracting openings 11e communicate with a vacuum route 12 provided in the interior of the main body portion 11a.

The vacuum route 12 passes through the interiors of the main body portion 11a and the shaft portion 11b, and is connected to a vacuum exhaust system, not shown, through the interior of the rotary shaft supporting portion 13. By the interior of the vacuum route being evacuated, the attraction and holding of the back surface of the substrate 3 by the attracting opening 11e is done. The rotary shaft supporting portion 13 is fixed to the horizontally extending surface of a base 8 which is the frame of the apparatus 1. Also, the rotary shaft supporting portion 13 has a bearing 14 for the table therein, and can rotate the shaft portion 11b through the bearing 14 and supports the shaft portion 11b so as to extend in a vertical direction. A table rotating motor 15 is supported by the base 8 so that the rotary shaft thereof may extend in the vertical direction (axial direction). Also, the rotary shaft of the motor 15 is connected so as to be coaxial with the shaft portion 11b of the rotary table 11. Thus, by the table rotating motor 15 being operated, the rotary table 11 is rotated about the shaft thereof.

The stamper thrusting-up system 30 is comprised of a thrusting-up motor 31 fixed to the base 8, a thrusting-up frame 33 axially vertically movably supported by the thrusting-up motor 31, a plurality of (three in the present embodiment) thrusting-up arms 35 axially rising from the thrusting-up frame 33, and thrusting-up rollers 37 supported by the thrusting-up arm 35. The thrusting-up arms 35 are disposed so as to be equidistant from one another with the rotation center of the rotary table 11 as the center and so that the arrangements thereof may be at equal angles (namely, at regular intervals). The thrusting-up rollers 37 are disposed correspondingly to the individual thrusting-up arms 35.

Figure 7:
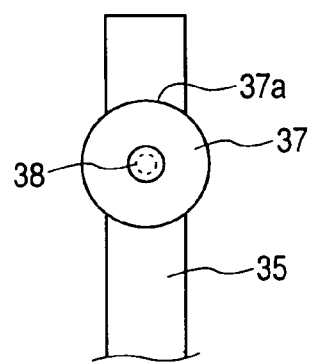
FIG. 7 shows the construction of a thrusting-up roller and a portion around it in the apparatus shown in FIG. 1, etc.

Also, the thrusting-up rollers 37 have a substantially cylindrical shape, and are supported by the thrusting-up arm 35 through a penetrating pin 38 penetrating through the axis of the cylindrical shape so as to be rotatable about the axis. The axis is set so as to be parallel to the substrate receiving surface 11c. FIG. 7 shows the thrusting-up roller 37 as it is seen from the center of the substrate. That area of the thrusting-up roller 37 which is the side of the cylindrical shape thereof and is located at the uppermost position contacts with the protruding portion (underside) of the stamper 6. When the substrate 3 is rotated about the axis thereof, the thrusting-up rollers 37 are also rotated about the penetrating pins 38 to thereby sequentially continuously move the contact area with the stamper 6.

The stamper holding system 50 has a plurality attracting pads 51 for attracting and holding the stripped-off stamper 6, a positioning rotary pin 53 for prescribing the positional relation between the attracting pads 51 and the substrate holding system 10, a substantially bar-shaped holding arm 55 for holding the attracting pads 51 and the positioning rotary pin 53 at one end thereof, an arm rotating cylinder 57 for rotatably supporting the holding arm 55 in a substantially horizontal plane at the other end of the holding arm 55, and an arm vertically moving cylinder 59 for supporting the holding arm 55, etc. for movement in a vertical direction (axial direction) with the arm rotating cylinder 57. The positioning rotary pin 53 is of a substantially bar shape, and is so shaped as to be engageable with the central portion of the projected portion 11d of the rotary table 11 at the central portion of the lower end portion 53a thereof. Specifically, a recess is formed in the central portion of the projected portion 11d, and the center of the lower end portion 53a has a downwardly convex drill shape. The top of this drill shape fits into the recess, whereby the positioning of these members is done.

The positioning rotary pin 53 is held at its upper end portion by the holding arm 55 through a bearing 61 for the rotary pin. The plurality of attracting pads 51 are disposed about the positioning rotary pin 53. The attracting pads 51 are of a substantially bar shape, have attracting surfaces in the lower end portions thereof, and are supported at the upper end portions thereof by the holding arm 55. The attracting pads 51 are connected to a vacuum source, not shown, and actually attract and hold the stamper 6 through the vacuum source. When the stamper 6 is attracted by the attracting pads 51, the stamper 6 jumped by elasticity may sometimes collide against the lower end portion of the attracting pads 51. Therefore, it is preferable that the attracting pads 51, particularly the lower end portions thereof, be formed of soft rubber or the like which is relatively soft and alleviates the shock during the collision.

In a state in which the substrate has been actually mounted on the present apparatus, the attracting pads 51 and the positioning rotary pin 53 are located at such positions as shown in FIGS. 2 to 6. However, when the substrate is to be supplied to the present apparatus and when it is to be discharged from the present apparatus, the attracting pads 51, etc. are retracted from the upper space of the substrate holding system 10 by the action of the arm vertically moving cylinder 59 and the arm rotating cylinder 57.

The thrusting-up rollers 37 and the stamper 6 are always in contact with each other and move their contact position. Therefore, there is the undesirable possibility that static electricity may be generated by the friction or the like of these members and this static electricity may charge the stamper 6 or the substrate 3. When these members are charged, there is conceivable the possibility that dust or the like may adhere to the surfaces of the individual members due to the static electricity, and this may cause a defect to an optical disc. Therefore, it is preferable that for example, a charge eliminating construction such as a so-called nitrogen gun for charge elimination be added to the holding arm 55 or the like so that the stripping-off operation can be performed in a charge-eliminated atmosphere.

The step of actually stripping off the stamper 6 from the substrate by the use of the above-described apparatus will hereinafter be described with reference to FIGS. 1 to 6. A substrate having the stamper 6 stuck thereon and on which the hardening of the resin layer 4 has been completed is mounted on the apparatus according to the present invention which is in the state shown in FIG. 1. Actually, the substrate 3 is placed on the substrate receiving surface 11c of the rotary table 11 by a conveying apparatus, not shown. At that time, the projected portion 11d is inserted into the through-aperture of the substrate 3 or the like, and the positioning of the substrate 3 and the rotary table is done. Subsequently, the attraction and holding of the substrate 3 by the attracting opening 11e is done through the vacuum route 12. At this stage, the arm rotating cylinder 57 is operated to thereby move the positioning rotary pin 53 to just above the projected portion 11d.

Further, the arm vertically moving cylinder 59 is operated to thereby move down the positioning rotary pin 53, etc. The tip end of the lower end portion of the positioning rotary pin 53 and the tip end portion of the projected portion 11d contact with and fit to each other, whereby the operation of the arm vertically moving cylinder 59 is stopped. The thrusting-up rollers 37 are preset so that in a state in which the substrate 3 has been attracted and held by the rotary table 11, the uppermost area thereof may contact with or slightly downwardly separate from the protruding portion of the stamper 6. The stamper thrusting-up system 30 stands by in this state during the attraction of the substrate.

Here, the rotary operation of the rotary table 11 is started by the table rotating motor 15. At this time, the positioning rotary pin 53 contacts with and becomes integral with the projected portion 11d, but by the action of the bearing 61 for the rotary pin, the positioning rotary pin 53 performs a rotating operation together with the rotary table 11 (see FIG. 3). With the start of the rotating operation of the rotary table 11, the thrusting-up motor 31 begins to operate to thereby begin to drive the thrusting-up arm 35 upwardly (in the axial direction). By this operation, the thrusting-up rollers 37 are also elevated, and the uppermost surfaces of the cylinder portions thereof come into contact with the protruding portion of the stamper 6. The rotating operation of the rotary table 11 and the elevation of the thrusting-up rollers 37 are continued. With the rotation of the rotary table 11, the contact portions of the stamper 6 contacting with the thrusting-up rollers 37 are successively moved in the circumferential direction thereof. However, these rollers are rotatable, and with the movement of the contact portions, the thrusting-up rollers 37 themselves are rotated to thereby move the contact portions of the thrusting-up rollers 37 side. Accordingly, rubbing, friction or the like occurring between the rollers and the stamper is minimized.

When the amount of elevation of the thrusting-up rollers 37 has reached a certain degree or greater, stripping-off begins to occur from the portion between the stamper and the resin layer of the stamper which is nearest to the rollers. With the rotation of the rotary table 11, the stripping-off which has occurred is expanded in the circumferential direction of the stamper (see FIG. 4). The elevation of the thrusting-up rollers 37 is further continued, whereby with the expansion of the stripping-off in the circumferential direction, the expansion of the stripping-off in the diametral direction also progresses. The area in which the stripping-off starts and the area in which the expansion of the stripping-off progresses most remarkably are an area in which the elastic deformation of the stamper 6 is greatest, i.e., a stuck portion nearest to the contact point between the thrusting-up rollers 37 and the stamper 6. In the present invention, this contact point continuously moves in the circumferential direction of the stamper 6 with a low frictional force and therefore, locally great deformation is prevented from concentrating in and occurring to a particular portion of the stamper 6.

Figure 5:
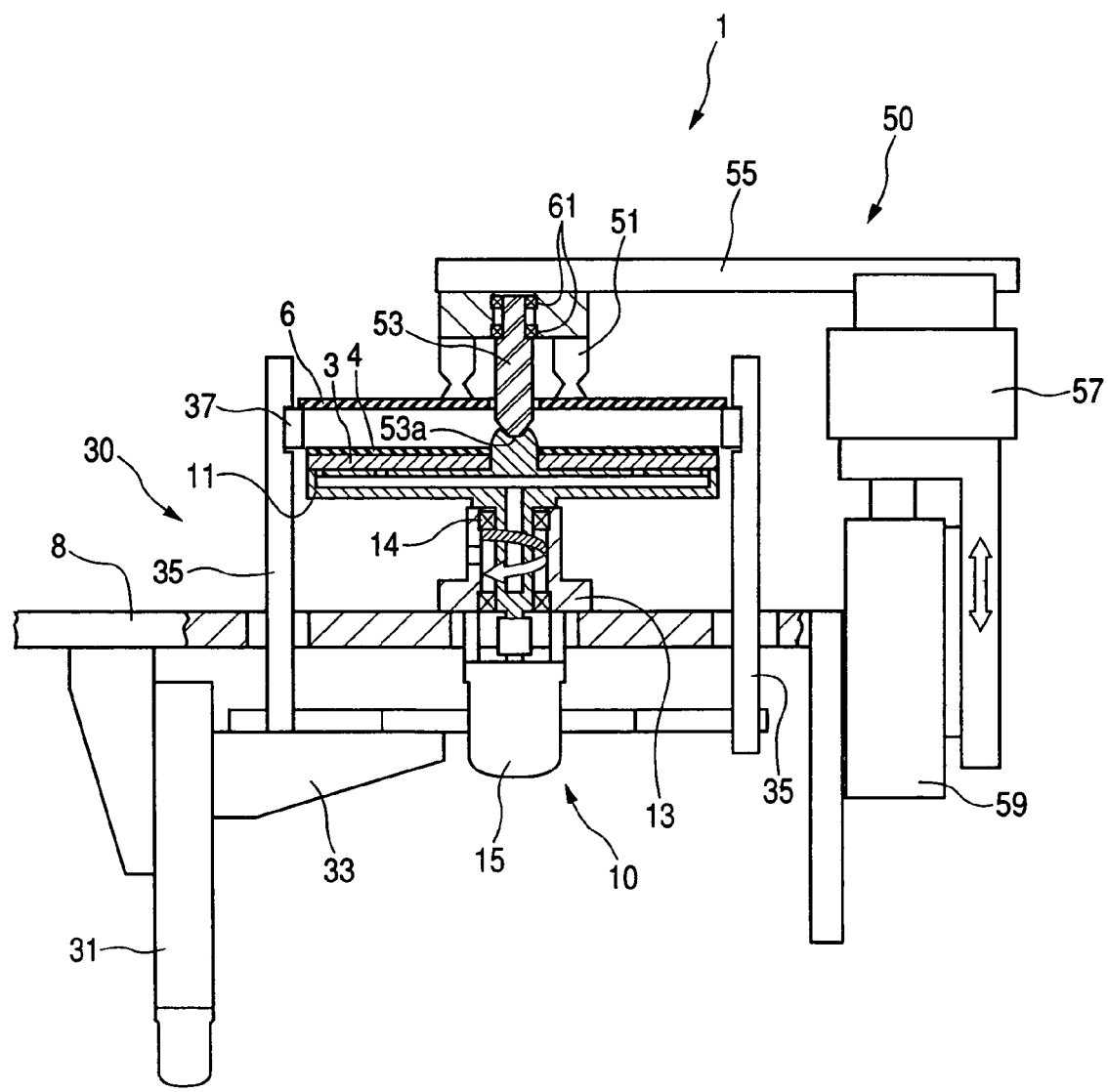
FIG. 5 shows a state in which the stamper has been completely stripped off in the apparatus shown in FIG. 1.
Figure 6:
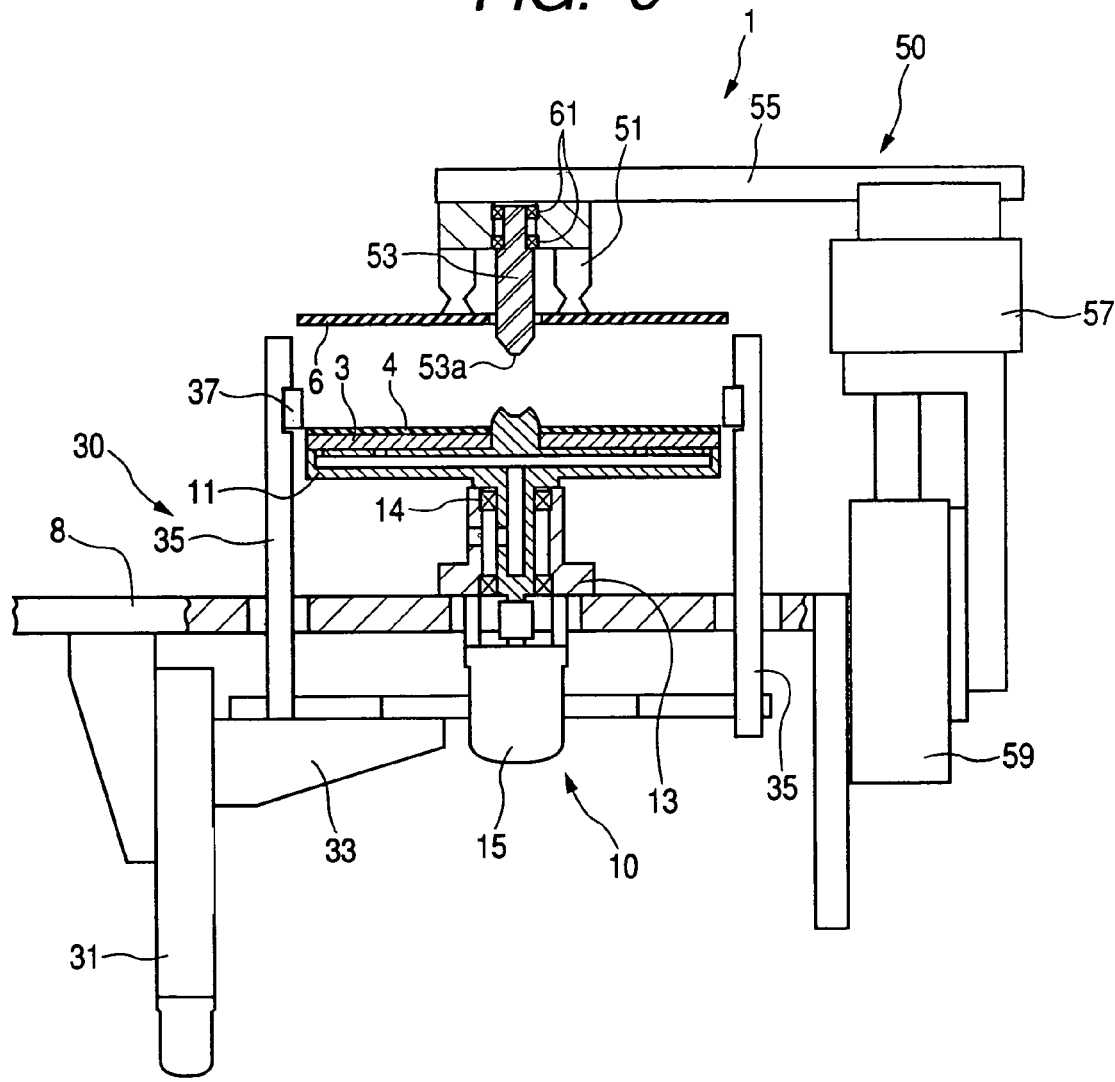
FIG. 6 shows a state immediately before in the apparatus shown in FIG. 1, the stripper off stamper is moved to a discrete apparatus.

The progress of the stripping-off extends to the entire stuck area between the stamper and the resin layer, whereby the stamper 6 is completely stripped off from the resin layers 4. At that time, the stamper 6 retrieves bending deformation by its own elasticity (restitutive property), and is thus supported as a flat plate material by the thrusting-up rollers 37. The attracting surfaces at the lower ends of the attracting pads 51 are fixed in advance to the holding arm 55 in such a manner as to be in a position in which they contact with the flat surface of the stamper 6 at this time. FIG. 5 shows a state in which the stripping-off has been thus completed and the stamper 6 has been attracted to and held by the attracting pads 51.

Here, the elevating operation of the thrusting-up arm 35, etc. is stopped. Thereafter, the attracting pads 51 holding the stamper 6 are further carried upwardly by the arm vertically moving cylinder 59 (see FIG. 6), and is conveyed to a stamper containing position by the arm rotating cylinder 57. At the same time, the substrate from which the stamper has been stripped off is conveyed to a further step by a substrate conveying system, not shown. Thereafter, the thrusting-up arm 35, etc. are retracted to their original standby positions, and become ready for the stripping-off step for the next substrate.

By the execution of the above-described steps, it becomes possible to execute the stripping-off step without imparting damage or the like even to a thinner stamper. In the present embodiment, design is made such that the table side holding the substrate is rotated and the thrusting-up roller side is elevated. The present invention, however, is not restricted to this embodiment, but the table side may be moved down and the thrusting-up roller side may be rotated so that the center of the substrate may become the center. Accordingly, it is preferable that the operation of the thrusting-up rollers and the operation of the rotary table be grasped as relative elevation and relative rotation, respectively.

In the present embodiment, the table rotating motor corresponds to a first driving device for rotating the table relative to the rollers (thrusting-up rollers) with the center of the table as the rotation center. This driving device is connected to the underside of the table. Also, the thrusting-up motor corresponds to a second driving device for elevating the rollers relative to the table in a direction perpendicular to the circular surfaces on the upper surface of the table. This driving device is connected to the rollers through a thrusting-up arm for supporting the rollers for rolling movement, i.e., a roller supporting arm. Also, it is preferable that the substrate holding surface of the rotary table be a circular surface, and the outer diameter thereof be equal to or smaller than the outer diameter of the substrate. Thereby, it becomes possible to give a margin to a system of the thrusting-up rollers, and the thrusting-up roller becomes capable of easily contacting with the protruding area of the stamper.

A too small number of thrusting-up rollers is not preferable because the number of the contact points between the rollers and the stamper is small and the degree of concentration of a load becomes great. Also, if the number of the rollers is too great, a force applied to the stuck surface at the start of the striping-off becomes great and it becomes difficult to reliably attract and hold the substrate to and on the rotary table, and it is not preferable. Accordingly, it is preferable that the number of the thrusting-up rollers be three or more and less than six, and it is more preferable from the viewpoints of the simplification of the apparatus construction and the aligning accuracy of the plurality of rollers that the number of the thrusting-up rollers be three or four.

Also, in the present embodiment, the apparatus construction can be simplified and therefore, the operations of various constructions are restricted to the interior of a horizontal plane and a direction perpendicular to this plane, and each construction is built with these planes as the reference. However, with the foot print of a conveying system for conveying the substrate, etc. to the present apparatus, or of the apparatus itself, or the ease or the like of the holding of the stamper taken into account, such a modification as disposing the constructions with the vertical direction made converse, or using a vertical plane as the reference is possible. Also, it is desirable that each driving system be suitably changed in conformity with such conditions as the required operation accuracy, operation range and operation speed. Also, as the substrate, use is made of a disc-shaped substrate having an ordinary through-aperture, but it is possible to use one of substrates of various shapes such as a substantially disc-shaped substrate having a cylindrical projection on the central portion thereof which is proposed by the applicant.

Description will now be made of the result of the stripping-off of the resin layer and the stamper actually executed by the use of the stripping-off apparatus according to the present invention. The basic construction of the apparatus used in the present embodiment particularly differs in no way from that of the above-described embodiment and therefore need not be described here. In the present embodiment, use is made of a polycarbonate substrate having a thickness of 1 mm, a diameter of 120 mm and a central aperture diameter of 15 mm. Various kinds of film were formed on the surface of this substrate by sputtering, and an ultraviolet ray-setting resin layer having a thickness of about 20 µm was further formed thereon, and an ultraviolet ray transmissive stamper having a thickness of 0.6 mm was stuck thereon, and the groove of the stamper was transferred to and formed on the resin layer.

The substrate with the stamper obtained in this manner was mounted on the present apparatus, and the stripping-off of the stamper was effected. In the present embodiment, there is adopted a construction in which the number of the thrusting-up rollers 37 is three. As the result, in spite of the stamper having been used up to a number of times greatly exceeding the number of times of use up to which the stamper has been interchanged in the conventional apparatus, no deformation or the like occurred to this stamper. As described above, by carrying out the present invention, it has become possible to execute the stripping-off step without imparting damage or the like even to a thinner stamper.

The foregoing embodiment has been described with chiefly the spacer layer in a blue-ray disc as the object. However, the object of application of the present invention is not restricted to these layers, but the present invention is applicable to the step of stripping off a stamper from various resin layers during the groove formation in a DVD, the pattern formation on the surface of a disc-shaped substrate by a stamper, etc.

As many apparently widely different embodiments of the present invention can be made without departing from the spirit and scope thereof, it is to be understood the invention is not limited to the specific embodiment thereof except as defined in the appended claims.

What is claimed is:

1. An apparatus for manufacturing an optical disc by which a disc-shaped stamper stuck on the upper surface of a disc-shaped substrate with a resin layer interposed therebetween so as to be concentric with said disc-shaped substrate and having an outer diameter larger than the outer diameter of said disc-shaped substrate is stripped-off from said disc-shaped substrate, comprising:
    a table contacting with the underside of said disc-shaped substrate to thereby attract and hold said substrate and having as the upper surface thereof a circular surface having an outer diameter equal to or small than that of said disc-shaped substrate;
    rollers disposed at locations equidistant from the center of said circular surface of said table and at regular intervals around said table, contacting with an area which is the surface of said stamper opposed to said disc-shaped substrate and which protrudes from the area stuck on said disc-shaped substrate, and capable of rolling relative to the contacting surface of said stamper by having a rolling axis extending in parallel with the surface of said stamper;
    a first driving device for rotating said table relative to said rollers with the center of said circular surface of said table as a rotation center; and
    a second drive device for elevating said rollers relative to said circular surface of said table in a direction perpendicular to said circular surface, wherein
    each of said rollers relatively moves along a periphery of said stamper while contacting with the contacting surface of said stamper by relative rotational movement of said table and said rollers.

2. An apparatus according to claim 1, wherein said table is connected to the first driving device at the underside thereof, and said first driving device rotates said table.

3. An apparatus according to claim 1, wherein said rollers are connected to said second driving device through a roller supporting arm for supporting said rollers for rolling movement, and said second driving device elevates said rollers.

4. An apparatus according to claim 1, further comprising an attracting pad located above said table and at a predetermined distance from said circular surface for attracting and holding said stripped-off stamper.

5. A method of manufacturing an optical disc by which a disc-shaped stamper stuck on the upper surface of a disc-shaped substrate with a resin layer interposed therebetween so as to be concentric with said disc-shaped substrate and having an outer diameter larger than the outer diameter of said disc-shaped substrate is stripped off from said disc-shaped substrate, said method comprising the steps of:
    causing the substrate having said stamper stuck thereon to be attracted to and held on the circular surface of a table contacting with the underside of said disc-shaped substrate to thereby attract and hold said substrate and having as the upper surface thereof a circular surface having an outer diameter equal to or smaller than that of said disc-shaped substrate;
    bringing rollers disposed at locations equidistant from the center of said circular surface of said table and at regular intervals around said table, contacting with an area which is the surface of said stamper opposed to said disc-shaped substrate and which protrudes from the area stuck on said disc-shaped substrate, and capable of rolling relative to the contacting surface of said stamper into contact with said protruding area by having a rolling axis extending in parallel with the surface of said stamper; and
    rotating said table relative to said rollers with the center of said circular surface of said table as a rotation center and at the same time, elevating said rollers relative to said circular surface of said table in a direction perpendicular to said circular surface,
    wherein during rotating said table, each of said rollers relatively moves along a periphery of said stamper while contacting with the contacting surface of said stamper by relative rotational movement of said table and said rollers.

* * * * *